H. W. GEHR.
MOTOR CYCLE.
APPLICATION FILED MAR. 21, 1912.
1,053,377.
Patented Feb. 18, 1913.
3 SHEETS—SHEET 2.
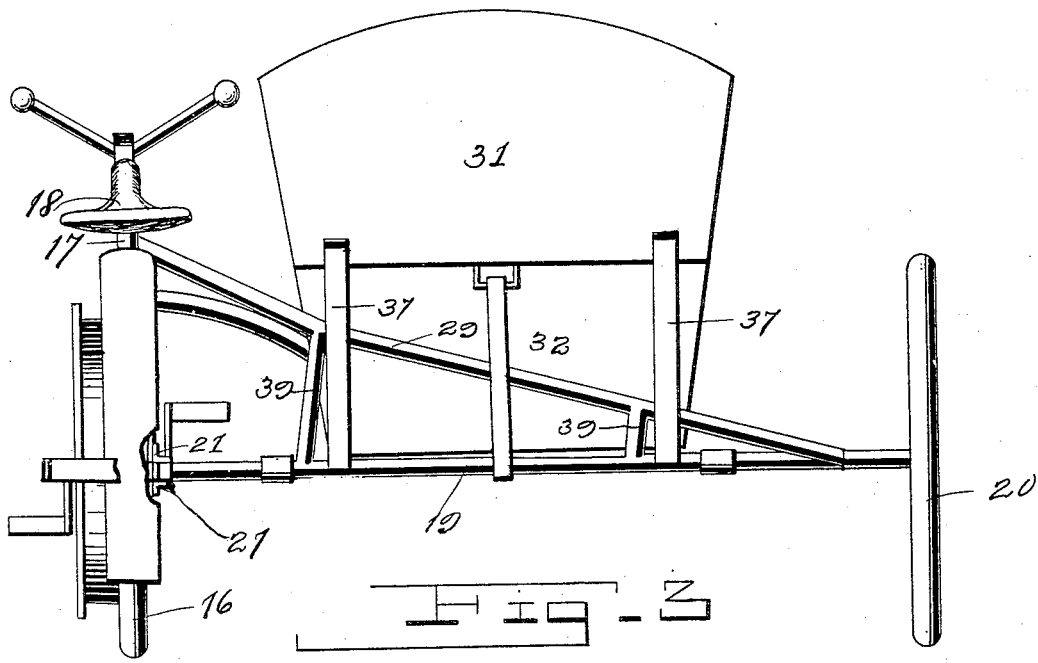
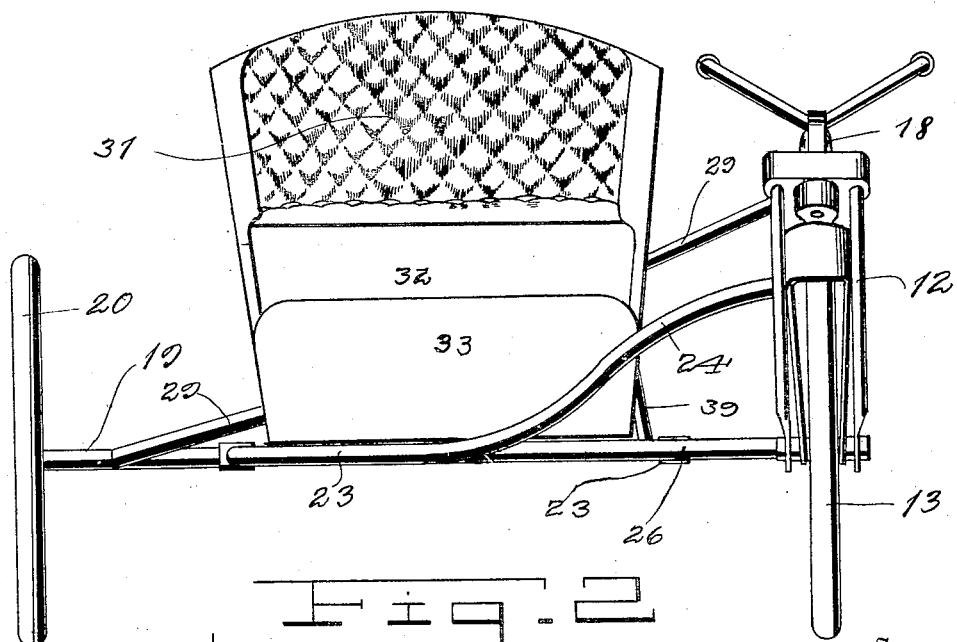
Witnesses
Herbert H. Porter Jr.
Francis Boyle
Inventor
H. W. Gehr
By
Attorney

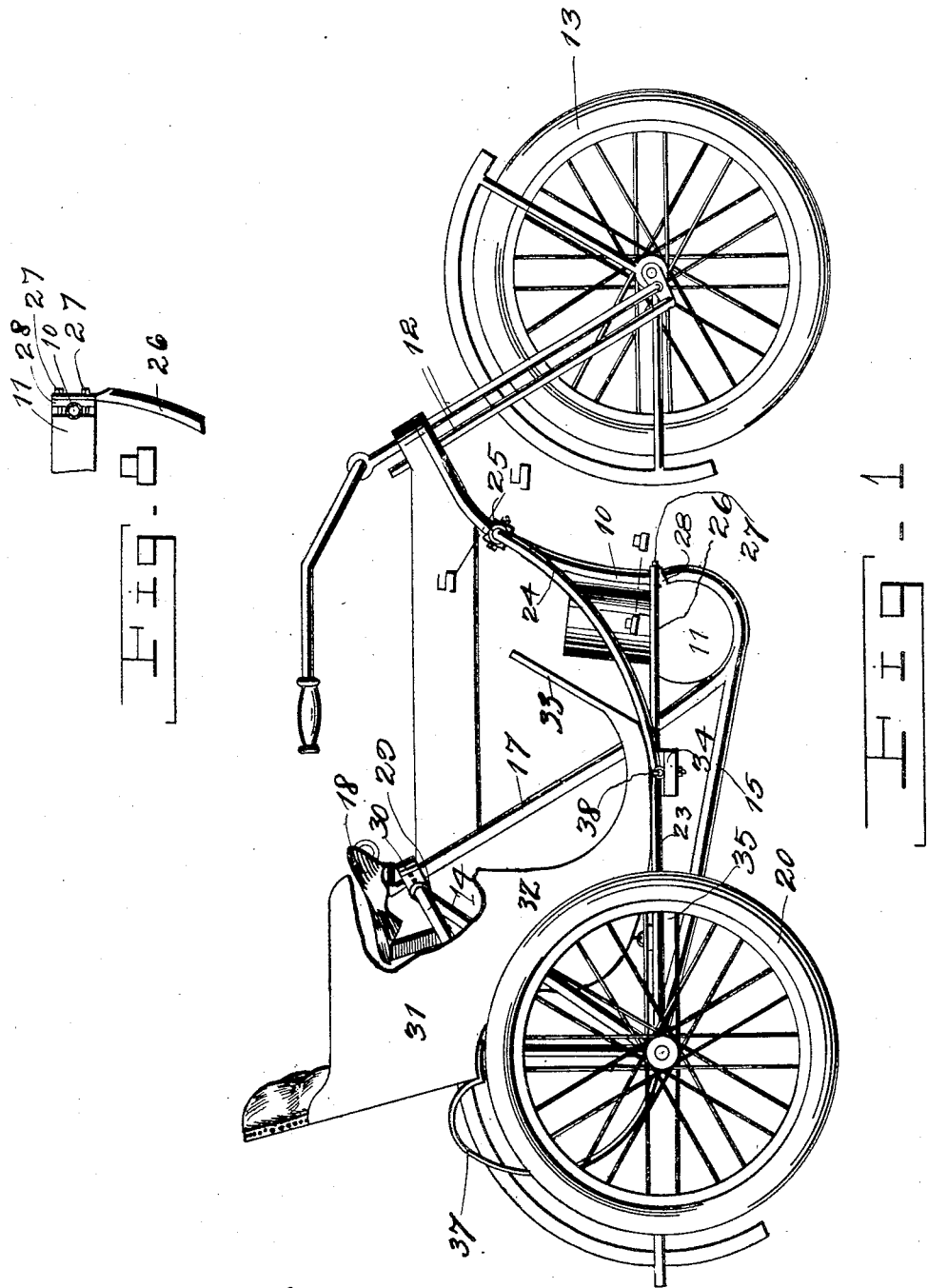

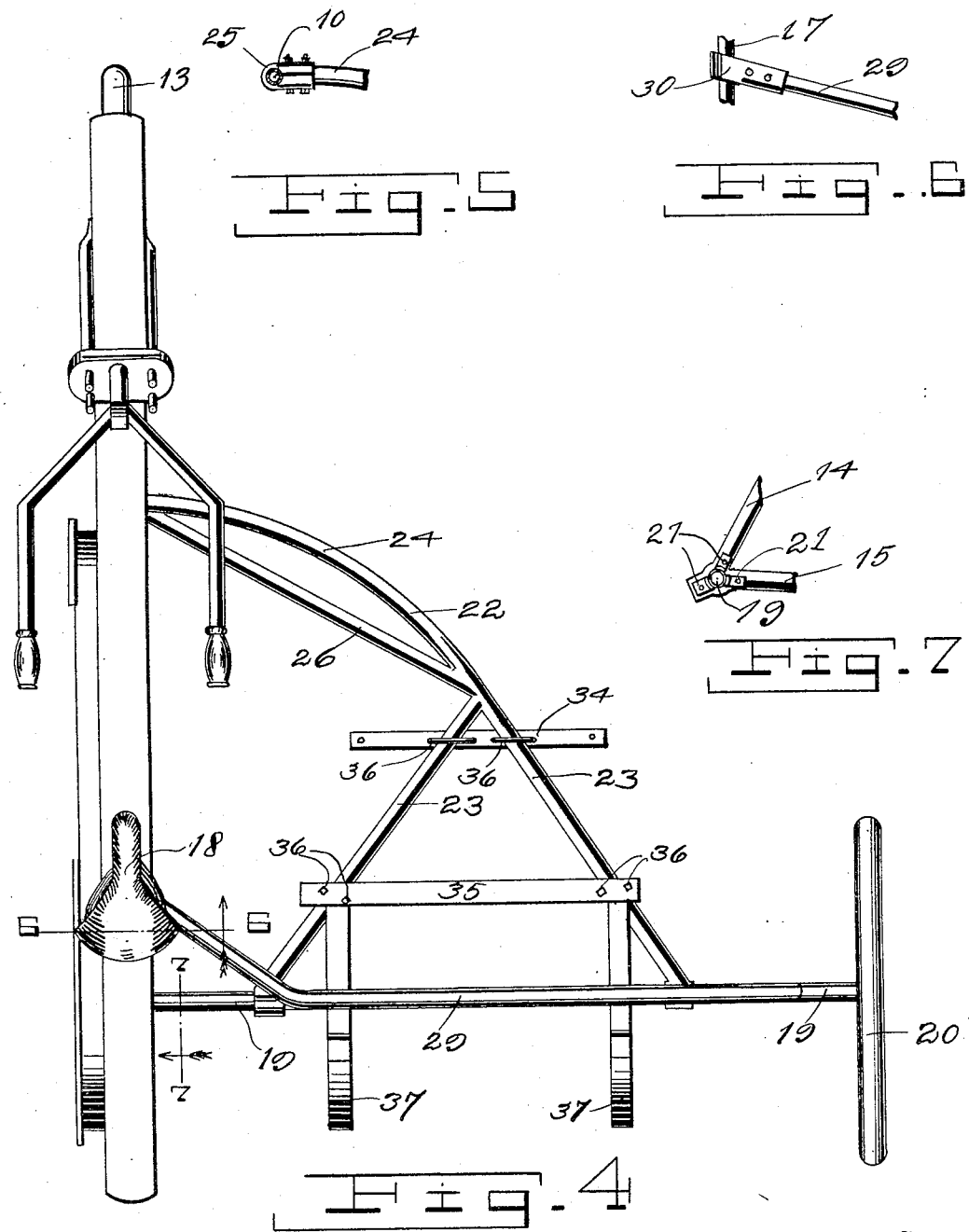

UNITED STATES PATENT OFFICE.

HENRY W. GEHR, OF WADENA, MINNESOTA.

MOTOR-CYCLE.

1,053,377. Specification of Letters Patent. Patented Feb. 18, 1913.

Application filed March 21, 1912. Serial No. 685,144.

*To all whom it may concern:*

Be it known that I, HENRY W. GEHR, a citizen of the United States, residing at Wadena, in the county of Wadena, State of Minnesota, have invented certain new and useful Improvements in Motor-Cycles; and I do hereby declare the following to be a full, clear, and exact description of the invention, such as will enable others skilled in the art to which it appertains to make and use the same.

This invention relates to motorcycles, more particularly to means for attaching a seat to a motorcycle for carrying passengers.

An object of the present invention is to provide a novel frame which may be attached to an ordinary motorcycle at four points, the frame carrying a ground wheel which is adapted to be spaced from the rear wheel of the motorcycle the same distance as the distance apart of the ground wheels of other vehicles, a seat being mounted on the frame in such a manner as to brace the different parts of the frame so that a maximum load may be carried with minimum strain upon the frame and motorcycle.

With the above objects in view the invention consists in certain novel details of construction and combination of parts hereinafter fully described and claimed, it being understood that various modifications may be made in the minor details of construction within the scope of the appended claims.

In the accompanying drawings forming part of this specification:—Figure 1 is a side elevation of a motorcycle equipped with an extension frame and seat constructed in accordance with my invention. Fig. 2 is a front elevation of the device. Fig. 3 is a rear elevation of the device. Fig. 4 is a plan view of the device with the seat removed to expose the frame. Fig. 5 is a fragmentary sectional view on the line 5—5 Fig. 1. Fig. 6 is a fragmentary sectional view on the line 6—6 Fig. 4. Fig. 7 is a fragmentary sectional view on the line 7—7 Fig. 4. Fig. 8 is a fragmentary sectional view on the line 8—8 Fig. 1.

Referring now to the drawings in which like characters of reference designate similar parts, a conventional motorcycle is shown having a frame including a front drop bar 10 upon which the motor 11 is supported, a front fork 12 to which the front wheel 13 is attached, a rear fork 14 and a reach fork 15 which coöperate in mounting the rear ground wheel 16, both of these last named forks being connected by a rear drop bar 17 to which the seat 18 is attached. These parts are of ordinary motorcycle construction and form no part of the present invention.

The frame for supporting the passenger seat consists of a rear axle 19 one end of which is equipped with a revoluble ground wheel 20, and the opposite end of which is attached to the motorcycle frame at the meeting of adjacent branches of the rear and reach forks. Any preferred manner of securing the end of the axle to the motorcycle frame may be employed, the expedient resorted to in the present embodiment of my invention comprising angle iron brackets 21 having legs bolted or otherwise secured to the axle 19, and their other legs secured by bolts to the meeting of the rear and reach forks.

A substantially Y-shaped reach bar 22 connects the axle with the forward drop bar 10 of the motorcycle frame, the branches 23 of this bar being terminally secured to the axle near the ground wheels 16 and 20 and the shank 24 being bent and uniformly curved upwardly and inwardly as shown most clearly in Fig. 2 to engage the said drop bar. Any preferred means may be utilized in attaching the reach bar to the motorcycle drop bar, the present embodiment employing a U-shaped strap 25 the bight of which straddles the forward drop bar above the engine, and the terminals of which are bolted to opposite sides of the reach bar. A supplementary reach bar 26 is connected to the reach bar 22 at the juncture of the branches of the latter, and extends forwardly in the horizontal plane of said branches, the forward end of the supplementary reach bar preferably being flattened and provided with openings to receive the bolts 27 of the bracket 28 which secures the crank case of the motor to the forward drop bar of the motorcycle. The means for attaching the supplementary reach bar to the Y-shaped or main reach bar, and for attaching the branches of the latter to the axle, is herein shown as bracing but any other suitable means may be employed within the scope of this invention.

An inclined brace bar 29 is braced or otherwise secured at one end to the axle near the ground wheel 20, and is secured at its opposite end to the rear drop bar 17 of the motorcycle frame, a substantially U-shaped strap 30 being straddled upon the drop bar and having its terminals bolted to opposite sides of the brace bar to attain this end.

From the foregoing it is clear that the seat supporting frame is connected to the motorcycle frame at four points, these points being arranged in substantially parallel planes and furthermore it will be noted that the upwardly inclined shank of the main reach, and the brace bar, reinforce the motorcycle against collapsing inwardly upon the passenger seat during severe conditions of service, such as when traveling over rutty roads.

The passenger carrying seat 31 is formed with a downwardly and forwardly sloping under body 32, which terminates in a dash 33. The seat may be formed of sufficient size to accommodate one or more passengers as desired. For securing the seat in position, a cross bar 34 is secured to the under sides of the reach branches near their meeting, and a second cross bar 35 is secured to the upper sides of the branches intermediate their meeting and terminals, these bars being secured in position through the instrumentality of U-bolts or the like 36. A pair of rearwardly and upwardly curving leaf springs 37 are bolted or otherwise secured at their forward ends to the cross bar 35, and are bolted or otherwise secured at their rear ends to the seat. The under body of the seat is pivotally secured to the cross bar 34 through the instrumentality of interlocking eye bolts 38. The springs are of sufficient stiffness to cushion the passenger seat against shocks when traveling over rough roads, while at the same time prevent vibration of the seat under normal conditions of service.

In order to rigidly secure together the shaft 19 and brace 29, upright brace bars 39 are preferably braced at their terminals to these parts, these brace bars will prevent collapsing of the inclined brace bar upon the shaft should one of the springs be accidentally broken and let the seat drop upon the inclined brace bar.

What is claimed, is:—

1. The combination with a motorcycle frame including a front fork and front drop bar in its construction, and a front and a rear ground wheel carried by said frame, of an axle secured to said frame near said rear ground wheel, a substantially Y-shaped reach bar having its branches secured to said axle, and its shank secured to said drop bar near the juncture of the latter with said front fork, an inclined brace bar secured to said axle near the free end thereof, and secured to said frame near said rear ground wheel, a ground wheel carried on the free end of said axle, and a seat carried by said reach.

2. The combination with a motorcycle frame including in its construction a front fork and a front drop bar, and a front and a rear ground wheel carried by said frame, of a laterally disposed seat carrying frame comprising an axle secured to said motorcycle frame near said rear ground wheel, a substantially Y-shaped reach bar having branches secured to said axle, and having an upwardly and inwardly directed shank secured to said drop bar near the juncture of the latter with said front fork, a supplementary reach bar secured to the first named reach bar near the meeting of the branches thereof, and secured to said drop bar below said shank, an inclined brace bar secured to said axle and to said motorcycle frame near said rear ground wheel, a ground wheel on the free end of said axle, and a seat carried by said Y-shaped reach bar.

In testimony whereof, I affix my signature, in presence of two witnesses.

HENRY W. GEHR.

Witnesses:
W. G. HASTINGS,
F. H. GERES.